US012634948B2

(12) United States Patent
 Bhamri et al.

(10) Patent No.: US 12,634,948 B2
(45) Date of Patent: May 19, 2026

(54) TIME-DOMAIN RESOURCE ALLOCATION FOR MULTI-CELL SCHEDULING BY A SINGLE DCI

(71) Applicant: Apple Inc., Cupertino, CA (US)

(72) Inventors: Ankit Bhamri, Bad Nauheim (DE); Sigen Ye, San Diego, CA (US); Wei Zeng, Saratoga, CA (US); Chunxuan Ye, San Diego, CA (US); Dawei Zhang, Saratoga, CA (US); Haitong Sun, Cupertino, CA (US); Hong He, San Jose, CA (US); Huaning Niu, San Jose, CA (US); Seyed Ali Akbar Fakoorian, San Diego, CA (US)

(73) Assignee: Apple Inc., Cupertino, CA (US)

( * ) Notice: Subject to any disclaimer, the term of this patent is extended or adjusted under 35 U.S.C. 154(b) by 481 days.

(21) Appl. No.: 18/052,278

(22) Filed: Nov. 3, 2022

(65) Prior Publication Data

US 2024/0155620 A1     May 9, 2024

(51) Int. Cl.
 *H04W 72/23* (2023.01)
 *H04W 72/1263* (2023.01)

(52) U.S. Cl.
 CPC ....... *H04W 72/23* (2023.01); *H04W 72/1263* (2013.01)

(58) Field of Classification Search
 CPC ............ H04W 72/23; H04W 72/1263; H04W 72/0446
 See application file for complete search history.

(56) References Cited

U.S. PATENT DOCUMENTS

| | | | | |
|---|---|---|---|---|
| 2021/0258999 A1* | 8/2021 | Xu | .......................... | H04L 5/001 |
| 2022/0408464 A1* | 12/2022 | MolavianJazi | ... | H04W 72/0453 |
| 2023/0139269 A1* | 5/2023 | MolavianJazi | ....... | H04L 5/0044 370/329 |
| 2023/0276441 A1* | 8/2023 | Wang | ................ | H04W 72/1273 370/329 |
| 2023/0328714 A1* | 10/2023 | Choi | ..................... | H04L 5/0023 |
| 2024/0251401 A1* | 7/2024 | Xiong | ............... | H04W 72/1273 |
| 2024/0349273 A1* | 10/2024 | Bae | ................... | H04W 72/0446 |

* cited by examiner

*Primary Examiner* — Jae Y Lee
*Assistant Examiner* — Nhu Pham
(74) *Attorney, Agent, or Firm* — Fay Kaplun & Marcin, LLP

(57) ABSTRACT

A user equipment (UE) is configured to receive downlink control information (DCI), the DCI comprising a single time domain resource allocation (TDRA) field configured to indicate time domain resource allocations for multiple cells and determine time domain resource allocations for each cell scheduled by the DCI based on a mapping indicated by the single TDRA field in the DCI to one or more TDRA tables.

20 Claims, 11 Drawing Sheets

TDRA Cell Index Table 500

| Row Index | Cell 1 | Cell 2 | Cell 3 | Cell 4 |
|---|---|---|---|---|
| 0 | 0 | 0 | 2 | 1 |
| 1 | - | - | 0 | - |
| 2 | 1 | - | - | 2 |
| 3 | 0 | 0 | 3 | - |
| 4 | ... | .... | .... | .. |

TDRA Table 510
Cell 1

| Index | Slot Offset | Starting Symbol | Length | Mapping Type |
|---|---|---|---|---|
| 0 | 1 | 0 | 14 | A |
| 1 | 2 | 7 | 2 | B |
| 2 | 0 | 4 | 7 | B |
| 3 | 0 | 0 | 14 | A |

TDRA Table 512
Cell 2

| Index | Slot Offset | Starting Symbol | Length | Mapping Type |
|---|---|---|---|---|
| 0 | 2 | 0 | 12 | B |
| 1 | 0 | 4 | 2 | A |
| 2 | 1 | 5 | 7 | B |
| 3 | 0 | 0 | 14 | B |

TDRA Table 514
Cell 3

| Index | Slot Offset | Starting Symbol | Length | Mapping Type |
|---|---|---|---|---|
| 0 | 1 | 2 | 12 | B |
| 1 | 2 | 7 | 4 | B |
| 2 | 0 | 4 | 7 | B |
| 3 | 0 | 0 | 14 | A |

TDRA Table 516
Cell 4

| Index | Slot Offset | Starting Symbol | Length | Mapping Type |
|---|---|---|---|---|
| 0 | 1 | 0 | 10 | A |
| 1 | 2 | 7 | 4 | B |
| 2 | 0 | 4 | 3 | B |
| 3 | 0 | 0 | 10 | A |

Base Station 300

Signaling Diagram 400 gNB 120A

UE 110

Configuration information for TDRA cell index table 410

DCI 420

Determine the time domain resources to be used by multiple cells based on a mapping between the TDRA cell index table and corresponding TDRA tables 430

PUSCH/PDSCH using the indicated time domain resources 440

TDRA Cell Index Table 500

| Row Index | Cell 1 | Cell 2 | Cell 3 | Cell 4 |
|---|---|---|---|---|
| 0 | 0 | 0 | 2 | 1 |
| 1 | - | - | 0 | - |
| 2 | 1 | - | - | 2 |
| 3 | 0 | 0 | 3 | - |
| 4 | ⋯ | ⋯ | ⋯ | ⋯ |

Fig. 5a

TDRA Table 514
Cell 3

| Index | Slot Offset | Starting Symbol | Length | Mapping Type |
|---|---|---|---|---|
| 0 | 1 | 2 | 12 | B |
| 1 | 2 | 7 | 4 | B |
| 2 | 0 | 4 | 7 | B |
| 3 | 0 | 0 | 14 | A |

TDRA Table 516
Cell 4

| Index | Slot Offset | Starting Symbol | Length | Mapping Type |
|---|---|---|---|---|
| 0 | 1 | 0 | 10 | A |
| 1 | 2 | 7 | 4 | B |
| 2 | 0 | 4 | 3 | B |
| 3 | 0 | 0 | 10 | A |

TDRA Table 510
Cell 1

| Index | Slot Offset | Starting Symbol | Length | Mapping Type |
|---|---|---|---|---|
| 0 | 1 | 0 | 14 | A |
| 1 | 2 | 7 | 2 | B |
| 2 | 0 | 4 | 7 | B |
| 3 | 0 | 0 | 14 | A |

TDRA Table 512
Cell 2

| Index | Slot Offset | Starting Symbol | Length | Mapping Type |
|---|---|---|---|---|
| 0 | 2 | 0 | 12 | B |
| 1 | 0 | 4 | 2 | A |
| 2 | 1 | 5 | 7 | B |
| 3 | 0 | 0 | 14 | B |

Fig. 5b

TDRA Cell Index Table 600

| Index | Scheduled Cells |
|-------|-----------------|
| 0 | 0,0,3,2 |
| 1 | 1,0 |
| 2 | 3,0,1 |
| 3 | 0,3 |
| 4 | ... |
| ... | ... |

Fig. 6a

TDRA Table 614
Cell 3

| Index | Slot Offset | Starting Symbol | Length | Mapping Type |
|---|---|---|---|---|
| 0 | 1 | 2 | 12 | B |
| 1 | 2 | 7 | 4 | B |
| 2 | 0 | 4 | 7 | B |
| 3 | 0 | 0 | 14 | A |

TDRA Table 616
Cell 4

| Index | Slot Offset | Starting Symbol | Length | Mapping Type |
|---|---|---|---|---|
| 0 | 1 | 0 | 10 | A |
| 1 | 2 | 7 | 4 | B |
| 2 | 0 | 4 | 3 | B |
| 3 | 0 | 0 | 10 | A |

TDRA Table 610
Cell 1

| Index | Slot Offset | Starting Symbol | Length | Mapping Type |
|---|---|---|---|---|
| 0 | 1 | 0 | 14 | A |
| 1 | 2 | 7 | 2 | B |
| 2 | 0 | 4 | 7 | B |
| 3 | 0 | 0 | 14 | A |

TDRA Table 612
Cell 2

| Index | Slot Offset | Starting Symbol | Length | Mapping Type |
|---|---|---|---|---|
| 0 | 2 | 0 | 12 | B |
| 1 | 0 | 4 | 2 | A |
| 2 | 1 | 5 | 7 | B |
| 3 | 0 | 0 | 14 | B |

Fig. 6b gNB
120A

UE
110

Configuration information
for joint TDRA table 710

DCI 720

Determine the time domain
resources to be used by
multiple cells based on the
contents of the joint TDRA
table 730

PUSCH/PDSCH using the indicated time domain resources 740

Signaling Diagram 700

Joint TDRA Table 800

| Index | Cell 1 | | | | Cell 2 | | | | Cell 3 | | | |
|---|---|---|---|---|---|---|---|---|---|---|---|---|
| | Slot Offset | Starting Symbol | Length | Mapping Type | Slot Offset | Starting Symbol | Length | Mapping Type | Slot Offset | Starting Symbol | Length | Mapping Type |
| 0 | 1 | 0 | 14 | A | 0 | 3 | 7 | B | 2 | 1 | 10 | A |
| 1 | 2 | 7 | 2 | B | 0 | 4 | 4 | B | 2 | 2 | 12 | A |
| 2 | 0 | 4 | 7 | B | 1 | 0 | 12 | A | 0 | 4 | 7 | A |
| 3 | 0 | 0 | 14 | A | 1 | 0 | 14 | A | 1 | 0 | 14 | B |

Fig. 8a

| Index | Slot Offset | Starting Symbol | Length | Mapping Type |
|---|---|---|---|---|
| 0 | 1,0,2 | 0,0,1 | 14,14,10 | A,A,B |
| 1 | 2.0 | 7.0 | 2.12 | B,B |
| 2 | 0 | 4 | 7 | B |
| 3 | 0.1 | 0.2 | 14.10 | A,B |

Fig. 8b

TIME-DOMAIN RESOURCE ALLOCATION FOR MULTI-CELL SCHEDULING BY A SINGLE DCI

BACKGROUND

A network may support multi-cell scheduling by a single downlink control information (DCI) format. Time domain resource allocation for a set of cells co-scheduled by the DCI may be jointly indicated by a single time domain resource allocation (TDRA) field of the DCI.

SUMMARY

Some exemplary embodiments are related to a method performed by a user equipment (UE). The method includes receiving downlink control information (DCI), the DCI comprising a single time domain resource allocation (TDRA) field configured to indicate time domain resource allocations for multiple cells and determining time domain resource allocations for each cell scheduled by the DCI based on a mapping indicated by the single TDRA field in the DCI to one or more TDRA tables.

Other exemplary embodiments are related to a processor configured to receive downlink control information (DCI), the DCI comprising a single time domain resource allocation (TDRA) field configured to indicate time domain resource allocations for multiple cells and determine time domain resource allocations for each cell scheduled by the DCI based on a mapping indicated by the single TDRA field in the DCI to one or more TDRA tables.

Still further exemplary embodiments are related to a user equipment having a transceiver configured to communicate with a network and a processor communicatively coupled to the transceiver and configured to receive downlink control information (DCI), the DCI comprising a single time domain resource allocation (TDRA) field configured to indicate time domain resource allocations for multiple cells and determine time domain resource allocations for each cell scheduled by the DCI based on a mapping indicated by the single TDRA field in the DCI to one or more TDRA tables.

BRIEF DESCRIPTION OF THE DRAWINGS

FIGS. 5a-5b show an exemplary time domain resource allocation (TDRA) cell index table and corresponding TDRA tables according to various exemplary embodiments.

FIGS. 6a-6b show an exemplary TDRA cell index table and corresponding TDRA tables according to various exemplary embodiments.

FIGS. 8a-8b each show an exemplary joint TDRA table according to various exemplary embodiments.

DETAILED DESCRIPTION

Figure 1:
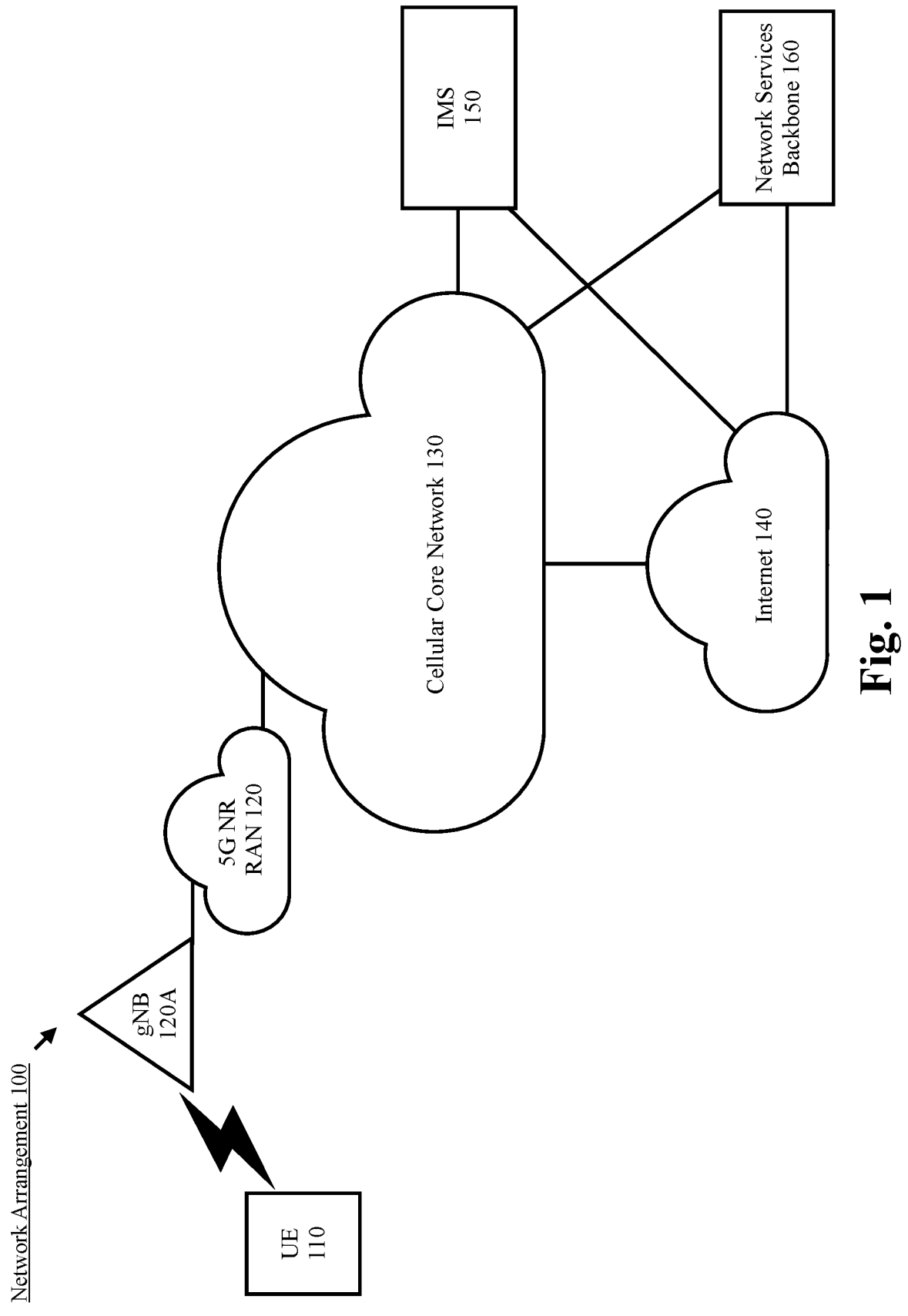
FIG. 1 shows an exemplary arrangement according to various exemplary embodiments.

The exemplary embodiments may be further understood with reference to the following description and the related appended drawings, wherein like elements are provided with the same reference numerals. The exemplary embodiments introduce techniques to support the implementation of time domain resource allocation for multi-cell scheduling by a single downlink control information.

The exemplary embodiments are described with regard to a user equipment (UE). However, reference to a UE is merely provided for illustrative purposes. The exemplary embodiments may be utilized with any electronic component that may establish a connection to a network and is configured with the hardware, software, and/or firmware to exchange information and data with the network. Therefore, the UE as described herein is used to represent any electronic component.

The exemplary embodiments are also described with regard to a fifth generation (5G) New Radio (NR) network. However, reference to a 5G NR network is merely provided for illustrative purposes. The exemplary embodiments may be utilized with any appropriate type of network that supports time domain resource allocation for multi-cell scheduling by a single DCI.

In addition, the exemplary embodiments are described with regard to DCI configured to schedule resources for uplink or downlink communication. In some examples, the single DCI format may be used to schedule multiple physical uplink shared channel (PUSCH) corresponding to multiple cells. Throughout this description, this exemplary DCI format may be referred to as DCI format 0_X. In other examples, the single DCI format may be used to schedule multiple physical downlink shared channel (PDSCH) corresponding to multiple cells. Throughout this description, this exemplary DCI format may be referred to as DCI format 1_X. However, reference to DCI format 0_X and DCI format 1_X is merely provided for illustrative purposes. The 0_X and 1_X classifications provided herein may serve as a placeholder. In an actual deployment scenario, the DCI formats may be assigned any other appropriate number or label instead of 0_X or 1_X.

The 5G NR network may support multi-cell scheduling for PDSCH/PUSCH using single DCI. In some deployment scenarios, for a set of cells co-scheduled by a single DCI, time domain resource allocation for the set of cells may be jointly indicated by a single TDRA field in the DCI. As will be described in more detail below, the exemplary embodiments introduce exemplary techniques related to the manner in which the single TDRA field may be used to indicate this type of scheduling information. The exemplary techniques introduced herein may be used independently from one another, in conjunction with other currently implemented mechanism for multi-cell scheduling using a single DCI, future implementations of mechanisms for multi-cell scheduling using a single DCI or independently from other mechanisms for multi-cell scheduling using a single DCI.

FIG. 1 shows an exemplary network arrangement 100 according to various exemplary embodiments. The exemplary network arrangement 100 includes a UE 110. Those skilled in the art will understand that the UE 110 may be any type of electronic component that is configured to communicate via a network, e.g., mobile phones, tablet computers, desktop computers, smartphones, phablets, embedded devices, wearables, Internet of Things (IoT) devices, etc. It should also be understood that an actual network arrangement may include any number of UEs being used by any number of users. Thus, the example of a single UE 110 is merely provided for illustrative purposes.

The UE 110 may be configured to communicate with one or more networks. In the example of the network configuration 100, the network with which the UE 110 may wirelessly communicate is a 5G NR radio access network (RAN) 120. However, the UE 110 may also communicate with other types of networks (e.g., sixth generation (6G) RAN, 5G cloud RAN, a next generation RAN (NG-RAN), a long-term evolution (LTE) RAN, a legacy cellular network, a wireless local area network (WLAN), etc.) and the UE 110 may also communicate with networks over a wired connection. With regard to the exemplary embodiments, the UE 110 may establish a connection with the 5G NR RAN 120. Therefore, the UE 110 may have at least a 5G NR chipset to communicate with the 5G NR RAN 120.

The 5G NR RAN 120 may be a portion of a cellular network that may be deployed by a network carrier (e.g., Verizon, AT&T, T-Mobile, etc.). The 5G NR RAN 120 may include, for example, base stations or access nodes (Node Bs, eNodeBs, HeNBs, eNBS, gNBs, gNodeBs, macrocells, microcells, small cells, femtocells, etc.) that are configured to send and receive traffic from UEs that are equipped with the appropriate cellular chip set.

Those skilled in the art will understand that any association procedure may be performed for the UE 110 to connect to the 5G NR RAN 120. For example, as indicated above, the 5G NR RAN 120 may be associated with a particular cellular provider where the UE 110 and/or the user thereof has a contract and credential information (e.g., stored on a SIM). Upon detecting the presence of the 5G NR RAN 120, the UE 110 may transmit the corresponding credential information to associate with the 5G NR RAN 120. More specifically, the UE 110 may associate with a specific base station (e.g., gNB 120A).

The network arrangement 100 also includes a cellular core network 130. The cellular core network 130 may be considered as an interconnected set of components or functions that manage the operation and traffic of the cellular network. The network arrangement 100 also includes the Internet 140, an IP Multimedia Subsystem (IMS) 150, and a network services backbone 160. The cellular core network 130 manages the traffic that flows between the cellular network and the Internet 140. The IMS 150 may be generally described as an architecture for delivering multimedia services to the UE 110 using the IP protocol. The IMS 150 may communicate with the cellular core network 130 and the Internet 140 to provide the multimedia services to the UE 110. The network services backbone 160 is in communication either directly or indirectly with the Internet 140 and the cellular core network 130. The network services backbone 160 may be generally described as a set of components (e.g., servers, network storage arrangements, etc.) that implement a suite of services that may be used to extend the functionalities of the UE 110 in communication with the various networks.

Figure 2:
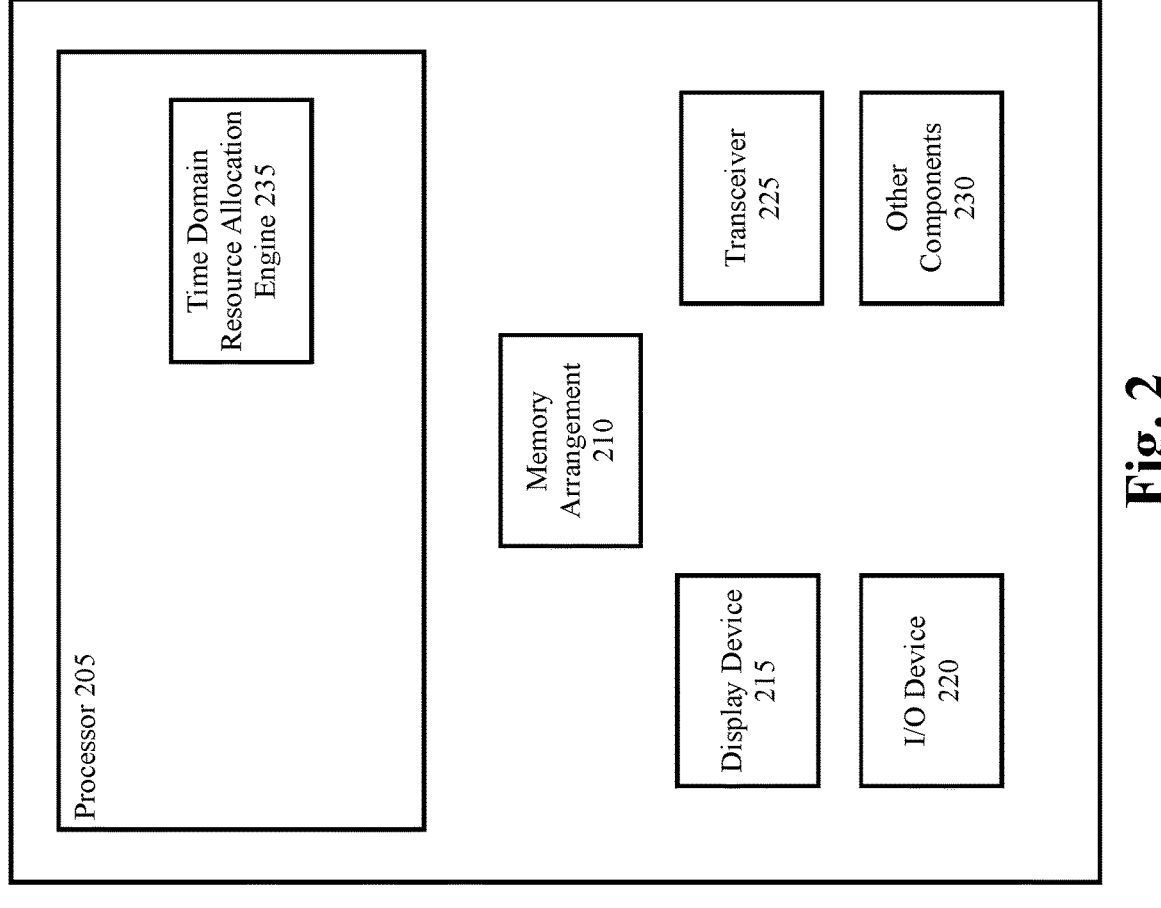
FIG. 2 shows an exemplary user equipment (UE) according to various exemplary embodiments.

FIG. 2 shows an exemplary UE 110 according to various exemplary embodiments. The UE 110 will be described with regard to the network arrangement 100 of FIG. 1. The UE 110 may include a processor 205, a memory arrangement 210, a display device 215, an input/output (I/O) device 220, a transceiver 225 and other components 230. The other components 230 may include, for example, an audio input device, an audio output device, a power supply, a data acquisition device, ports to electrically connect the UE 110 to other electronic devices, etc.

The processor 205 may be configured to execute a plurality of engines of the UE 110. For example, the engines may include a time domain resource allocation engine 235.

The time domain resource allocation engine 235 may perform various operations related to the exemplary techniques introduced herein.

The above referenced engine 235 being an application (e.g., a program) executed by the processor 205 is merely provided for illustrative purposes. The functionality associated with the engine 235 may also be represented as a separate incorporated component of the UE 110 or may be a modular component coupled to the UE 110, e.g., an integrated circuit with or without firmware. For example, the integrated circuit may include input circuitry to receive signals and processing circuitry to process the signals and other information. The engines may also be embodied as one application or separate applications. In addition, in some UEs, the functionality described for the processor 205 is split among two or more processors such as a baseband processor and an applications processor. The exemplary embodiments may be implemented in any of these or other configurations of a UE.

The memory arrangement 210 may be a hardware component configured to store data related to operations performed by the UE 110. The display device 215 may be a hardware component configured to show data to a user while the I/O device 220 may be a hardware component that enables the user to enter inputs. The display device 215 and the I/O device 220 may be separate components or integrated together such as a touchscreen. The transceiver 225 may be a hardware component configured to establish a connection with the 5G NR-RAN 120, an LTE-RAN (not pictured), a legacy RAN (not pictured), a WLAN (not pictured), etc. Accordingly, the transceiver 225 may operate on a variety of different frequencies or channels (e.g., set of consecutive frequencies).

Figure 3:
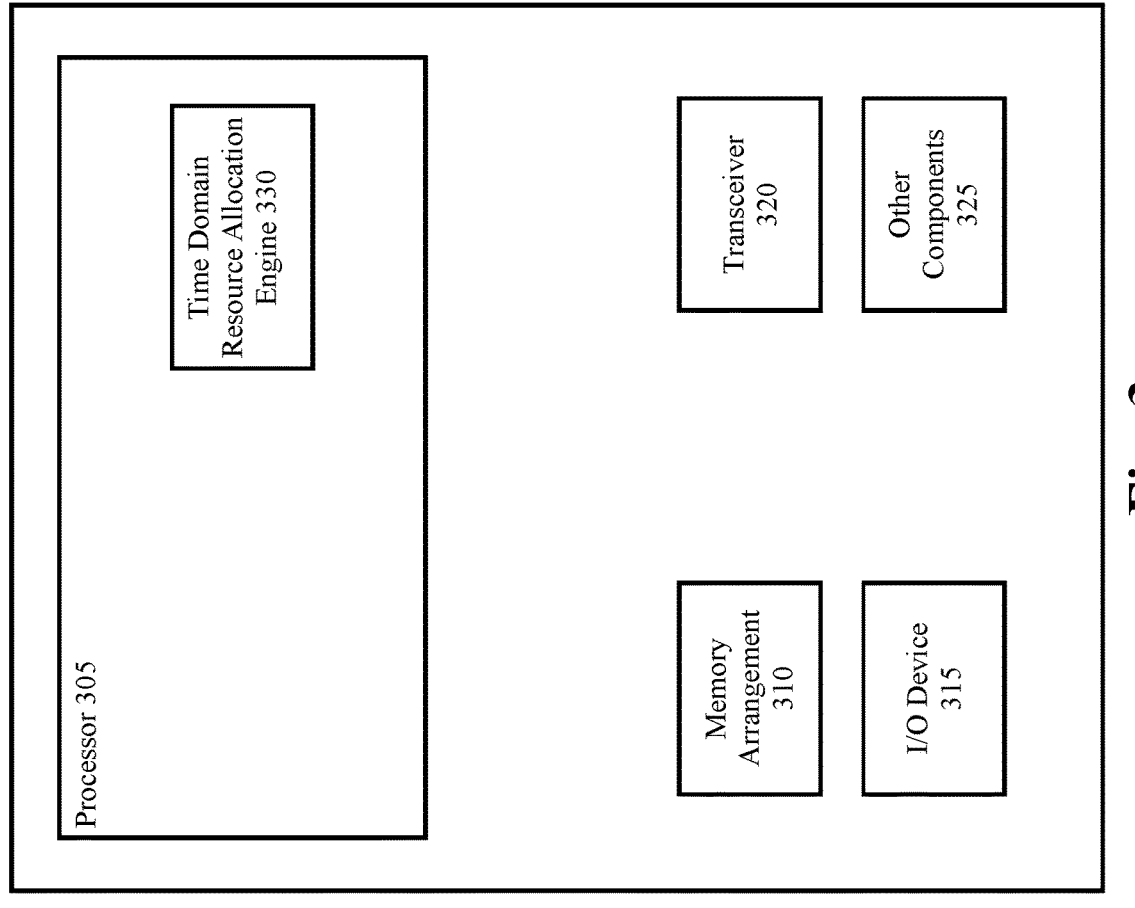
FIG. 3 shows an exemplary base station according to various exemplary embodiments.

FIG. 3 shows an exemplary base station 300 according to various exemplary embodiments. The base station 300 may represent the gNB 120A or any other access node through which the UE 110 may establish a connection and manage network operations.

The base station 300 may include a processor 305, a memory arrangement 310, an input/output (I/O) device 315, a transceiver 320 and other components 325. The other components 325 may include, for example, an audio input device, an audio output device, a battery, a data acquisition device, ports to electrically connect the base station 300 to other electronic devices and/or power sources, etc.

The processor 305 may be configured to execute a plurality of engines for the base station 300. For example, the engines may include a time domain resource allocation engine 330. The time domain resource allocation engine 330 may perform various operations related to the exemplary techniques introduced herein.

The above noted engine 330 being an application (e.g., a program) executed by the processor 305 is only exemplary. The functionality associated with the engine 330 may also be represented as a separate incorporated component of the base station 300 or may be a modular component coupled to the base station 300, e.g., an integrated circuit with or without firmware. For example, the integrated circuit may include input circuitry to receive signals and processing circuitry to process the signals and other information. In addition, in some base stations, the functionality described for the processor 305 is split among a plurality of processors (e.g., a baseband processor, an applications processor, etc.). The exemplary embodiments may be implemented in any of these or other configurations of a base station.

The memory 310 may be a hardware component configured to store data related to operations performed by the base station 300. The I/O device 315 may be a hardware component or ports that enable a user to interact with the base station 300. The transceiver 320 may be a hardware component configured to exchange data with the UE 110 and any other UE in the network arrangement 100. The transceiver 320 may operate on a variety of different frequencies or channels (e.g., set of consecutive frequencies). Therefore, the transceiver 320 may include one or more components (e.g., radios) to enable the data exchange with the various networks and UEs.

The UE 110 may be deployed in a network that supports multi-cell scheduling for PDSCH/PUSCH using single DCI. For a set of cells co-scheduled by a DCI format (e.g., DCI format 0_X, 1_X, etc.), time domain resource allocation for the set of cells may be jointly indicated by a single time domain resource allocation (TDRA) field in the DCI. As will be described in more detail below, the exemplary embodiments relate to the manner in which the single TDRA field may be used to indicate this type of scheduling information.

Figure 4:
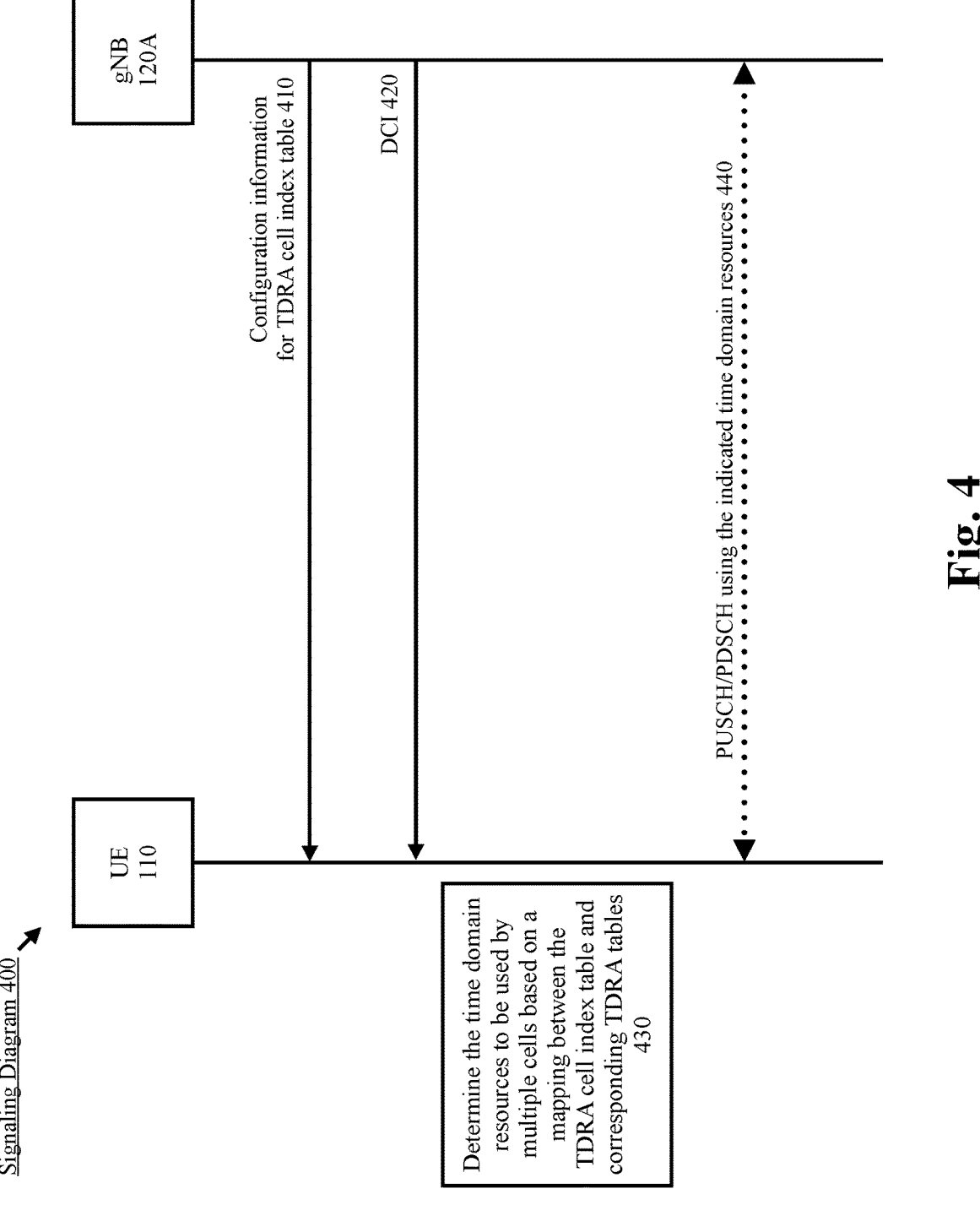
FIG. 4 shows a signaling diagram for time domain resource allocation for multi-cell scheduling by a single downlink control information (DCI) according to various exemplary embodiments.

FIG. 4 shows a signaling diagram 400 for time domain resource allocation for multi-cell scheduling by a single DCI according to various exemplary embodiments. The signaling diagram 400 includes the UE 110 and the gNB 120A of the network arrangement 100.

In this example, a TDRA cell index table is introduced that may be used in conjunction with multiple TDRA tables each corresponding to a different cell. The TDRA tables may indicate the time domain resources for PUSCH/PDSCH operation including parameters such as, but not limited to, start and length indicator value (SLIV), mapping type, scheduling offset (e.g., K0, K2, etc.). As will be described in more detail below, the exemplary TDRA cell index table may be associated with one or more TDRA tables each corresponding to a different cell. The TDRA field in a DCI may be configured to point to one of the entries in the TDRA cell index table which allows the UE 110 to determine the relevant time domain resources for each cell from their respective TDRA tables.

In 410, the UE 110 receives configuration information for the TDRA cell index table. As indicated above, the TDRA cell index table is associated with multiple TDRA tables each corresponding to a different cell. Throughout this description, to differentiate between cells that may be co-scheduled by a single DCI, reference is made to "cell 1, cell 2, cell 3 and cell 4." However, reference to four different cells being scheduled by a single DCI is merely provided for illustrative purposes, the exemplary embodiments may be utilized with any appropriate number of cells.

The configuration information for the TDRA cell index table may be provided via radio resource control (RRC) signaling or in any other appropriate manner. In some embodiments, the network may also configure the TDRA tables for each cell using RRC signaling. However, the exemplary embodiments TDRA cell index table and corresponding TDRA tables are not required to be configured via RRC. For example, the TDRA cell index table and/or the corresponding TDRA tables may be hard-encoded in 3GPP specification or preconfigured in any other appropriate manner.

In 420, the UE 110 receives a single DCI configured to schedule multiple cells. As mentioned above, the DCI may include a single TDRA field that points to an entry on the TDRA cell index table. Thus, the UE 110 may be semi-statically configured by a TDRA field or dynamically indicated by a TDRA field in the multi-cell scheduling single DCI.

As will be described in more detail below with regard to FIGS. 5a-5b and 6a-6b, in some embodiments, the TDRA cell index table may include multiple rows each comprising one or more indices. An index in a row of the TDRA cell index table may point to a row of a TDRA table corresponding to a particular cell. In 430, the UE 110 determines the time domain resources to be used by multiple cells based on the mapping between the TDRA cell index table and the corresponding TDRA tables.

In 440, the UE 110 performs an uplink transmission (e.g., PUSCH) or downlink reception (e.g., PDSCH) using the indicated time domain resources. The exemplary embodiments introduced herein may be used for uplink and/or downlink communication. For example, DCI format 0_X may be used to schedule multiple PUSCH corresponding to multiple cells. In another example, DCI format 1_X may be used to schedule multiple PDSCH corresponding to multiple cells. During operation, the UE 110 may maintain a first set of TDRA tables for PUSCH resource allocation and a second set of TDRA tables for PDSCH resources allocation.

In one approach, each entry (e.g., row, etc.) of the TDRA cell index table may include an explicit indication for each potentially scheduled cell. A non-limiting example of this type of TDRA cell index table is shown in FIG. 5a and a non-limiting example of corresponding TDRA tables for each cell are shown in FIG. 5b.

FIG. 5a shows an exemplary TDRA cell index table 500 according to various exemplary embodiments. In this example, it is assumed that the single DCI may be configured to schedule up to four cells. Thus, the TDRA cell index table includes a column for cell 1, cell 2, cell 3 and cell 4. The TDRA cell index table also includes a row index. The value of the row index column may be explicitly or implicitly indicated by the DCI. Each row includes zero or more indices each mapped to a different TDRA table. In some embodiments, if no index value in a row for a particular cell, it may be assumed that the cell is not scheduled.

FIG. 5b shows TDRA table 510 for cell 1, TDRA table 512 for cell 2, TDRA table 514 for cell 3 and TDRA table 516 for cell 4. In this example, each TDRA table 510-516 includes multiple columns each conveying a time domain resource allocation parameter, e.g., slot offset, starting symbol, length and mapping type. Each row in each TDRA table 510-516 shows a row index value that may be mapped to a cell index of the TDRA cell index table 500.

To provide an example within the context of the signaling 400, in 420, the UE 110 may receive a single DCI comprising a single TDRA field. The TDRA field may explicitly or implicitly indicate a row index value of the TDRA cell index table 500. In this non-limiting example, if the row index value for the TDRA table 500 is 0, the index value for cell 1 is 0 which maps to row index 0 of TDRA table 510. The UE 110 may the use the time domain resource indicated by row 0 of the TDRA table 510 to communicate with cell 1 in 440. The index value for cell 2 is 0 which maps to row index 0 of TDRA table 512. The UE 110 may then use the time domain resource indicated by row 0 of the TDRA table 512 to communicate with cell 2 in 440. Similarly, the UE 110 may use the time domain resources indicated by row 2 of TDRA table 514 and time domain resources indicated by row 1 for TDRA table 516.

Continuing with the above example, if the row index value for the TDRA table 500 is 1, the index value for cell 3 is 0 which maps to row index 0 of TDRA table 514. The UE 110 may then use the time domain resource indicated by row 0 of the TDRA table 514 to communicate with cell 3 in 440. In row 1, since there are no cell index values for cell 1, cell 2 or cell 4, it may be assumed that cell 1, cell 2 and cell 4 are not scheduled.

Continuing with the above example, if the row index value for the TDRA table 500 is 2, the index value for cell 1 is 1 which maps to row index 1 of TDRA table 510 and the index value for cell 4 is 2 which maps to row index 2 of TDRA table 516. If the row index value for the TDRA table 500 is 3, the index value for cell 1 is 0 which maps to row index 0 of TDRA table 510, the index value for cell 2 is 0 which maps to row index 0 of TDRA table 512 and the index value for cell 3 is 3 which maps to row index 3 of TDRA table 514. If the row index value for the TDRA table 500 is 4, it may be assumed that none of the corresponding cells are scheduled. The parameters, values and formats of the tables 500 and 510-516 shown in FIGS. 5a-5b are merely provided for illustrative purposes and are not intended to limit the exemplary embodiments in any way. The exemplary embodiments may be applied to any appropriate set of time domain resource parameters assigned any appropriate value and organized in any appropriate format.

In another approach, the TDRA cell index table may comprise an implicit indication for each scheduled cell. A non-limiting example of this type of TDRA cell index table is shown in FIG. 6a and a non-limiting example of corresponding TDRA tables for each cell are shown in FIG. 6b.

FIG. 6a shows an exemplary TDRA cell index table 600 according to various exemplary embodiments. In this example, it is assumed that the single DCI may be configured to schedule up to four cells.

The TDRA cell index table 600 includes a row index. The value of the row index column may be explicitly or implicitly indicated by the DCI. Each row index is associated with a sequence of indices corresponding to cells scheduled by the DCI. The sequence of indices may be mapped in a sequential manner to the cells that are actually scheduled by the DCI. The lowest scheduled cell index can be mapped to the first index indicated by the row, followed by increasing order of index for corresponding mapping. Thus, in this example, another field in the same DCI may indicate which cells of the four cells are actually scheduled by this DCI.

FIG. 6b shows TDRA table 610 for cell 1, TDRA table 612 for cell 2, TDRA table 614 for cell 3 and TDRA table 616 for cell 4. The TDRA tables 610-616 are the same as TDRA tables 510-516 of FIG. 5b.

To provide an example within the context of the signaling diagram 400, in 420, the UE 110 may receive a single DCI including at least a single TDRA field and a field indicating which cells of the four cells are scheduled by the DCI. The TDRA field may explicitly or implicitly indicate a row index value of the TDRA cell index table 600. In this non-limiting example, if the row index value of the TDRA table 600 is 0, the sequence of indices is 0, 0, 3, 2. Each index corresponds to a different cell where the mapping is done in a sequential manner to the cells that are actually transmitted. Thus, the index value for cell 1 is 0 which maps to row index 0 of TDRA table 610. The UE 110 may the use the time domain resource indicated by row 0 of the TDRA table 610 to communicate with cell 1 in 440. The index value for cell 2 is 0 which maps to row index 0 of TDRA table 612. The UE 110 may then use the time domain resource indicated by row 0 of the TDRA table 612 to communicate with cell 2 in 440. Similarly, the UE 110 may use the time domain resources indicated by row 3 of TDRA table 614 for cell 3 and time domain resources indicated by row 2 for TDRA table 616 for cell 4.

Continuing with the above example, if another field in the DCI indicates that cells 2 and 3 are scheduled by the DCI and the row index value for the TDRA table 600 is 1, the UE 110 may then use the time domain resource indicated by row 1 of the TDRA table 612 to communicate with cell 2 in 440. The UE 110 may also use the time domain resource indicated by row 0 of the TDRA table 614 to communicate with cell 3 in 440. In this example, only two cells are scheduled and thus, the sequence is two indices long.

Continuing with the above example, if another field in the DCI indicates that cells 2, 3 and 4 are scheduled by the DCI and the row index value for the TDRA table 600 is 2, the UE 110 may then use the time domain resource indicated by row 3 of the TDRA table 612 to communicate with cell 2 in 440. The UE 110 may also use the time domain resource indicated by row 0 of the TDRA table 614 to communicate with cell 3 in 440. The UE 110 may also use the time domain resource indicated by row 1 of the TDRA table 616 to communicate with cell 4 in 440. In this example, only three cells are scheduled and thus, the sequence is three indices long.

Continuing with the above example, if another field in the DCI indicates that cells 1 and 4 are scheduled by the DCI and the row index value for the TDRA table 600 is 3, the UE 110 may then use the time domain resource indicated by row 0 of the TDRA table 610 to communicate with cell 1 in 440. The UE 110 may also use the time domain resource indicated by row 3 of the TDRA table 616 to communicate with cell 4 in 440. In this example, only two cells are scheduled and thus, the sequence is two indices long.

If the row index value for the TDRA table 600 is 4, it may be assumed that none of the corresponding cells are scheduled. As mentioned above, it should be understood that the parameters, values and formats of tables 600 and 610-616 shown in FIGS. 6a-6b are merely provided for illustrative purposes and are not intended to limit the exemplary embodiments in any way. The exemplary embodiments may be applied to any appropriate set of time domain resource parameters assigned any appropriate value and organized in any appropriate format.

Figure 7:
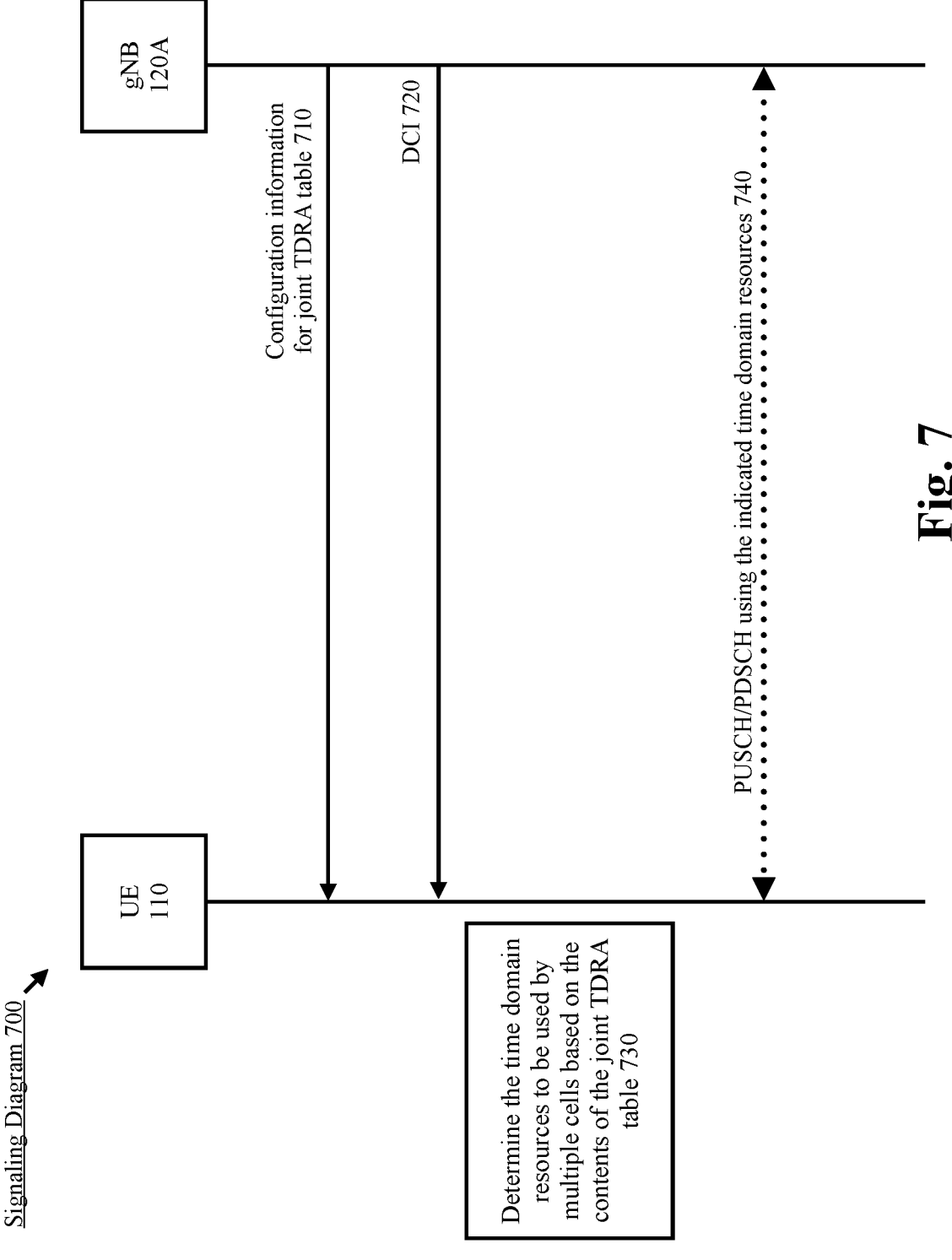
FIG. 7 shows a signaling diagram for time domain resource allocation for multi-cell scheduling by a single DCI according to various exemplary embodiments.

FIG. 7 shows a signaling diagram 700 for time domain resource allocation for multi-cell scheduling by a single DCI according to various exemplary embodiments. The signaling diagram 700 includes the UE 110 and the gNB 120A of the network arrangement 100.

In this example, a joint TDRA table is introduced that may be used for multiple cells. The joint TDRA table may indicate the time domain resources for PUSCH/PDSCH operation including parameters such as, but not limited to, start and length indicator value (SLIV), mapping type, scheduling offset. As will be described in more detail below, the exemplary joint TDRA table may be associated with multiple cells. The TDRA field in a DCI may be configured to point to one of the entries in the joint TDRA table which allows the UE 110 to determine the relevant time domain resources for each cell scheduled by the DCI.

In 710, the UE 110 receives configuration information for the joint TDRA table. The configuration information for the joint TDRA table may be provided via RRC signaling or in any other appropriate manner.

As indicated above, the joint TDRA table is associated with multiple cells. Throughout this description, to differentiate between cells that may be co-scheduled by a single DCI, reference is made to "cell 1, cell 2 and cell 3." However, reference to three different cells being scheduled by a single DCI is merely provided for illustrative purposes, the exemplary embodiments may be utilized with any appropriate number of cells.

In 720, the UE 110 receives a single DCI configured to schedule multiple cells. The DCI may include a single TDRA field that points to an entry on the joint TDRA table. Thus, the UE 110 may be semi-statically configured by a TDRA field or dynamically indicated by a TDRA field in the multi-cell scheduling single DCI.

As will be described in more detail below with regard to FIGS. 8*a*-8*b*, in some embodiments, the joint TDRA table may include multiple rows each comprising parameter values for multiple time domain resources (e.g., slot offset, starting symbol, length, mapping type, etc.). In some embodiments, a first portion of the parameter values in the row may correspond to a first cell, a second portion of parameters values in the row may correspond to a second cell, a third portion of parameters values in the row may correspond to a third cell, etc. In 730, the UE 110 determines the time domain resources to be used by multiple cells based on the contents of the joint TDRA table.

In 740, the UE 110 performs an uplink transmission (e.g., PUSCH) or downlink reception (e.g., PDSCH) using the indicated time domain resources. The exemplary embodiments introduced herein may be used for uplink and/or downlink communication. For example, DCI format 0_X may be used to schedule multiple PUSCH corresponding to multiple cells. In another example, DCI format 1_X may be used to schedule multiple PDSCH corresponding to multiple cells. During operation, the UE 110 may maintain a first set of TDRA tables for PUSCH resource allocation and a second set of TDRA tables for PDSCH resources allocation.

In one approach, each entry (e.g., row, etc.) of the joint TDRA table may include an explicit indication for each potentially scheduled cells. A non-limiting example of this type of joint TDRA table is shown in FIG. 8*a*.

FIG. 8*a* shows an exemplary joint TDRA table 800 according to various exemplary embodiments. In this example, it is assumed that the single DCI may be configured to schedule up to three cells. Thus, the joint TDRA table 800 includes a set time domain resource parameters for each for cell 1, cell 2 and cell 3. The joint TDRA table also includes a row index. The value of the row index column may be explicitly or implicitly indicated by the DCI. Each row includes parameter values for each of the scheduled cells.

To provide an example within the context of the signaling diagram 700, in 720, the UE 110 may receive DCI pointing to a row index of the joint TDRA table 800. In this non-limiting example, if the row index value for the joint TDRA table 800 is 0, the parameter values in that row indicate the time domain resource parameters to be used for the PUSCH/PDCSCH corresponding to each of the cells.

In another approach, each entry of the joint TDRA table may include an implicit indication for each potentially scheduled cells. A non-limiting example of this type of joint TDRA table is shown in FIG. 8*b*.

FIG. 8*b* shows an exemplary joint TDRA table 850 according to various exemplary embodiments. In this example, it is assumed that the single DCI may be configured to schedule up to three cells. The joint TDRA table may include a row index. The value of the row index column may be explicitly or implicitly indicated by the DCI.

Thus, the joint TDRA table 850 further includes a column for slot offset, a column for stating symbol, a column for length and a column for mapping type. Each parameter may include a sequence of values. The sequence of values may be mapped in a sequential manner to the cells that are actually scheduled.

To provide an example within the context of the signaling diagram 700, in 720, the UE 110 may receive a single DCI including at least a single TDRA field and a field indicating which cells of the three cells are scheduled by the DCI. The TDRA field may explicitly or implicitly indicate a row index value of the TDRA cell index table 850. In this non-limiting example, if the row index value of the TDRA table 850 is 0, the sequence of values for each parameter correspond to cells 1-3 respectively. Thus, to communicate with cell 1, the UE 110 may use a slot offset of 1, a starting symbol of 0, a length of 14 and a mapping type A. To communicate with cell 2, the UE 110 may use a slot offset of 0, a starting symbol of 0, a length of 14 and a mapping type A. To communicate with cell 3, the UE 110 may use a slot offset of 2, a starting symbol of 1, a length of 10 and a mapping type B.

Continuing with the above example, if cells 1 and 3 are scheduled by the DCI and the row index value of the TDRA table 850 is 1, the sequence of values for each parameter correspond to cells 1 and 3 respectively. Thus, to communicate with cell 1, the UE 110 may use a slot offset of 2, a starting symbol of 7, a length of 2 and a mapping type B. To communicate with cell 3, the UE 110 may use a slot offset of 0, a starting symbol of 0, a length of 12 and a mapping type A.

Continuing with the above example, if cell 2 is scheduled by the DCI and the row index value of the TDRA table 850 is 2, the values for each parameter correspond to cell 2. Thus, to communicate with cell 2, the UE 110 may use a slot offset of 0, a starting symbol of 4, a length of 7 and a mapping type B.

Continuing with the above example, if cells 2 and 3 are scheduled by the DCI and the row index value of the TDRA table 850 is 3, the sequence of values for each parameter correspond to cells 2 and 3 respectively. Thus, to communicate with cell2, the UE 110 may use a slot offset of 0, a starting symbol of 0, a length of 14 and a mapping type A. To communicate with cell 3, the UE 110 may use a slot offset of 1, a starting symbol of 2, a length of 10 and a mapping type B.

According to some aspects, multiple TDRA tables may be configured each corresponding to a different combination of potentially scheduled cells. Based on the indication of the actual scheduled cells in the DCI, a corresponding TDRA table may be used that includes parameter values for multiple cells. For example, consider a scenario in which up to four cells (e.g., cell 1, cell 2, cell 3, cell 4) may be scheduled by the DCI. For scenarios where three of the four cells re actually scheduled by the network, the UE 110 may be configured with multiple TDRA tables each comprising a different combination of cells. Thus, the UE 110 may have a first TDRA table for cells 1, 2 and 3, a second TDRA table for cells 1, 2 and 4, a third TDRA table for cells 1, 3 and 4 and a fourth TDRA table for cells 2, 3 and 4. Depending on the actually scheduled cells, the DCI may map to one of the TDRA tables. Thus, if cells 1, 2 and 4 are scheduled by the DCI, the TDRA field indication may be mapped to the second TDRA table for cells 1, 2, and 4.

In some embodiments, the TDRA tables and/or joint TDRA tables may be configured at the UE 110 by the scheduling cell that is configured to schedule multiple cells via the single DCI. In some embodiments, an indication of time domain resources and an indication of actually scheduled cells are jointly indicated. Thus, the actually scheduled cells may be indicated by the TDRA table used by the UE 110 to determine the time domain resources.

According to some aspects, a single DCI bitfield may be used to indicate to multiple TDRA tables corresponding to cells scheduled by the DCI. In one approach, the bitfield size may be fixed regardless of the actual number of scheduled cells. For example, if eight bits are allocated for joint indication of TDRA tables and four cells are scheduled, then two bits may be associated with each scheduled cell. The mapping of bits to TDRA tables may be done in sequential order (e.g., a first two bits corresponds to the TDRA table for cell 1, a second two bits corresponds to the TDRA table for cell 2, etc.). If eight bits are allocated for joint indication of TDRA tables and two cells are scheduled, then four bits may be associated with each scheduled cell.

In another approach, the number of bits that may be used to indicate the TDRA table for a cell are fixed and also the overall bitfield size is fixes. In this example, the sum of the bits for all the cells should not be more than the fixed total bitfield size. In a case where the sum of the bits for all the cells is less than the total bitfield size, then zero padding may be done for the remaining bits to reach the fixed size limitation.

In another approach, a single bitfield may be used to correspond to the same row in respective TDRA tables corresponding to each of the scheduled calls. For example, if four cells are scheduled and the bitfield indicates to row 1, then the TDRA table for each of the scheduled cells is determined from row index 1 of their respective TDRA tables.

Examples

In a first example, a processor is configured to receive downlink control information (DCI), the DCI comprising a single time domain resource allocation (TDRA) field configured to indicate time domain resource allocations for multiple cells and determine time domain resource allocations for each cell scheduled by the DCI based on a mapping indicated by the single TDRA field in the DCI to one or more TDRA tables.

In a second example, the processor of the first example, further configured to receive, prior to receiving the DCI, configuration information of a scheduling cell for one or more rows of a TDRA cell index table.

In a third example, the processor of the second example, wherein the configuration information for the one or more rows of the TDRA cell index table is provided via radio resource control (RRC).

In a fourth example, the processor of the second example, wherein each row of the TDRA cell index table includes one or more indices each corresponding to a different TDRA table of a potentially scheduled cell.

In a fifth example, the processor of the fourth example, wherein a row of the TDRA cell index table comprises an explicit indication for each cell potentially scheduled by the DCI.

In a sixth example, the processor of the fourth example, wherein a row of the TDRA cell index table comprises an indication that at least one cell from a set of cells potentially scheduled by the DCI is not scheduled.

In a seventh example, the processor of the second example, wherein a row of the TDRA cell index table comprises an implicit indication for each cell scheduled by the DCI.

In an eighth example, the processor of the seventh example, wherein a mapping between the row of the TDRA cell index table and each of the cells scheduled by the DCI is based on a sequential manner according to a scheduled cell index.

In a ninth example, the processor of the first example, further configured to receive, prior to receiving the DCI, configuration information for one or more rows of a joint TDRA table.

In a tenth example, the processor of the ninth example, wherein each row of the joint TDRA table comprises multiple time domain resources.

In an eleventh example, the processor of the tenth example, wherein each row further comprises an explicit indication of time domain resources to cells potentially scheduled by the DCI.

In a twelfth example, the processor of the tenth example, wherein each row further comprises an implicit indication of time domain resources to cells scheduled by the DCI.

In a thirteenth example, the processor of the twelfth example, wherein a mapping between the joint TDRA table and each of the cells scheduled by the DCI is based on a sequential manner according to a scheduled cell index.

In a fourteenth example, the processor of the first example, wherein a single DCI bitfield is used to indicate to multiple TDRA tables corresponding to cells scheduled by the DCI.

In a fifteenth example, the processor of the fourteenth example, wherein a size of the single DCI bitfield is fixed regardless of the number of cells scheduled by the DCI and a number of bits corresponding to each cell is based on the number of cells scheduled by the DCI.

In a sixteenth example, the processor of the fourteenth example, wherein a size of the single DCI bitfield is fixed regardless of the number of cells scheduled by the DCI and a number of bits corresponding to each cell is fixed.

In a seventeenth example, the processor of the fourteenth example, wherein the single DCI bitfield corresponds to a same row in multiple different TDRA tables.

In an eighteenth example, the processor of the first example, wherein the UE is configured with multiple TDRA tables each TDRA table corresponding to a different combination of scheduled cells.

In a nineteenth example, the processor of the first example, wherein a joint TDRA table is configured at the UE by a cell that is configured to scheduled multiple cells via a single DCI.

In a twentieth example, the processor of the first example, wherein the DCI is mapped to a TDRA table and wherein the TDRA table indicates which cells are schedule by the DCI.

In a twenty first example, a user equipment (UE) comprises a transceiver configured to communicate with a network and the processor of any of the first through twentieth examples.

Those skilled in the art will understand that the above-described exemplary embodiments may be implemented in any suitable software or hardware configuration or combination thereof. An exemplary hardware platform for implementing the exemplary embodiments may include, for example, an Intel x86 based platform with compatible operating system, a Windows OS, a Mac platform and MAC OS, a mobile device having an operating system such as iOS, Android, etc. The exemplary embodiments of the above-described method may be embodied as a program containing lines of code stored on a non-transitory computer readable storage medium that, when compiled, may be executed on a processor or microprocessor.

Although this application described various embodiments each having different features in various combinations, those skilled in the art will understand that any of the features of one embodiment may be combined with the features of the other embodiments in any manner not specifically disclaimed or which is not functionally or logically inconsistent with the operation of the device or the stated functions of the disclosed embodiments.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

It will be apparent to those skilled in the art that various modifications may be made in the present disclosure, without departing from the spirit or the scope of the disclosure. Thus, it is intended that the present disclosure cover modifications and variations of this disclosure provided they come within the scope of the appended claims and their equivalent.

What is claimed:

1. A method performed by a user equipment (UE), comprising:

receiving downlink control information (DCI) scheduling multiple cells, the DCI comprising a single time domain resource allocation (TDRA) field containing a value with a first mapping to a first row of a TDRA cell index table comprising multiple rows, each row of the TDRA cell index table comprising multiple indices, wherein each index of the multiple indices corresponds to a different cell of the multiple cells and has a second mapping to a different TDRA table; and determining a start and length indicator value (SLIV) for each cell of the multiple cells based on the first mapping and the second mapping.

2. The method of claim 1, further comprising:

receiving, prior to receiving the DCI, configuration information for multiple rows of the TDRA cell index table.

3. The method of claim 2, wherein the configuration information for the multiple rows of the TDRA cell index table is provided via radio resource control (RRC).

4. The method of claim 1, wherein each row of the TDRA cell index table comprises an explicit indication for each cell scheduled by the DCI.

5. The method of claim 2, wherein row of the TDRA cell index table comprises an implicit indication for each cell scheduled by the DCI.

6. The method of claim 1, further comprising:

receiving, prior to receiving the DCI, configuration information for one or more rows of a joint TDRA table.

7. The method of claim 6, wherein each row of the joint TDRA table comprises multiple time domain resources.

8. The method of claim 7, wherein each row further comprises an explicit indication of time domain resources to cells potentially scheduled by the DCI.

9. The method of claim 7, wherein each row further comprises an implicit indication of time domain resources to cells scheduled by the DCI.

10. The method of claim 9, wherein a mapping between the joint TDRA table and each of the cells scheduled by the DCI is based on a sequential manner according to a scheduled cell index.

11. The method of claim 1, wherein a single DCI bitfield is used to indicate to multiple TDRA tables corresponding to cells scheduled by the DCI.

12. The method of claim 11, wherein a size of the single DCI bitfield is fixed regardless of a number of cells scheduled by the DCI and a number of bits corresponding to each cell is based on the number of cells scheduled by the DCI.

13. The method of claim 11, wherein a size of the single DCI bitfield is fixed regardless of a number of cells scheduled by the DCI and a number of bits corresponding to each cell is fixed.

14. The method of claim 11, wherein the single DCI bitfield corresponds to a same row in multiple different TDRA tables.

15. The method of claim 1, wherein the UE is configured with multiple TDRA tables each TDRA table corresponding to a different combination of scheduled cells.

16. An apparatus comprising processing circuitry configured to:

process, based on signaling received from a base station, downlink control information (DCI) scheduling multiple cells, the DCI comprising a single time domain resource allocation (TDRA) field containing a value with a first mapping to a first row of a TDRA cell index table comprising multiple rows, each row of the TDRA cell index table comprising multiple indices, wherein each index of the multiple indices corresponds to a different cell of the multiple cells and has a second mapping to a different TDRA table; and determine a start and length indicator value (SLIV) for each cell of the multiple cells based on the first mapping and the second mapping.

17. A non-transitory computer readable storage medium comprising a set of instructions that when executed by a processor cause the processor to:

process, based on signaling received from a base station, downlink control information (DCI) scheduling multiple cells, the DCI comprising a single time domain resource allocation (TDRA) field containing a value with a first mapping to a first row of a TDRA cell index table comprising multiple rows, each row of the TDRA cell index table comprising multiple indices, wherein each index of the multiple indices corresponds to a different cell of the multiple cells and has a second mapping to a different TDRA table; and determine a start and length indicator value (SLIV) for each cell of the multiple cells based on the first mapping and the second mapping.

18. The apparatus of claim 16, wherein the processing circuitry is further configured to:

process, based on signals received from the base station, configuration information for multiple rows of the TDRA cell index table.

19. The apparatus of claim 18, wherein the configuration information for the multiple rows of the TDRA cell index table is provided via radio resource control (RRC).

20. The apparatus of claim 16, wherein each row of the TDRA cell index table comprises an explicit indication for each cell scheduled by the DCI.

* * * * *